(12) United States Patent
Huang et al.

(10) Patent No.: US 6,565,909 B1
(45) Date of Patent: May 20, 2003

(54) STABLE WHIPPED FROSTINGS

(75) Inventors: Victor Tsangmin Huang, Moundsview, MN (US); Fern Alane Panda, New Brighton, MN (US); Diane Rae Rosenwald, Plymouth, MN (US)

(73) Assignee: The Pillsbury Company, Minneapolis, MN (US)

( * ) Notice: Subject to any disclaimer, the term of this patent is extended or adjusted under 35 U.S.C. 154(b) by 42 days.

(21) Appl. No.: 09/991,312

(22) Filed: Nov. 16, 2001

(51) Int. Cl.[7] .................................................. A23G 3/14
(52) U.S. Cl. ........................ 426/572; 426/578; 426/602; 426/604; 426/606; 426/659; 426/661
(58) Field of Search ............................... 426/572, 578, 426/602, 606, 654, 661, 604, 659

(56) References Cited

U.S. PATENT DOCUMENTS

| | | |
|---|---|---|
| 3,592,663 A | 7/1971 | Brunner et al. |
| 3,656,971 A | 4/1972 | Reimer |
| 3,751,265 A | 8/1973 | Seiden |
| 3,955,008 A | 5/1976 | Hanamoto |
| 4,107,343 A | 8/1978 | Petricca |
| 4,146,652 A | 3/1979 | Kahn et al. |
| 4,770,892 A | 9/1988 | Grealy et al. |
| 5,102,680 A  * | 4/1992 | Glass et al. ................. 426/572 |
| 5,439,697 A | 8/1995 | Gonzalez-Sanz |
| 5,529,800 A | 6/1996 | Bourns et al. |
| 5,571,555 A  * | 11/1996 | Huang et al. ................ 426/659 |
| 6,368,645 B2 * | 4/2002 | Huang et al. ................. 426/94 |

FOREIGN PATENT DOCUMENTS

| CA | 996405 | 9/1976 |
|---|---|---|

OTHER PUBLICATIONS

"Nutritive Sweetners From Corn" Corn Refiners Association, Inc., Copyright© 1989, pp. 1–32.
"Maltrin® Maltodextrins and Corn Syrup Solids For Food Formulations" Grain Processing Corporation Product Brochure, Copyright© 1993, pp. 1–21.

* cited by examiner

*Primary Examiner*—Nina Bhat
(74) *Attorney, Agent, or Firm*—Annette M. Frawley; Douglas J. Taylor; Jean A. Lown

(57) ABSTRACT

A low density, ready-to-serve frosting is provided that can be stored for extended periods of time with little or no separation of the aqueous and shortening phases and with minimal volume changes. The frosting is stabilized by the formation of an aqueous phase gel rather than by manipulation of the composition of the shortening phase. The aqueous phase gel comprises water and maltodextrin, water and inulin, or water and a mixture of maltodextrin and inulin.

32 Claims, No Drawings

STABLE WHIPPED FROSTINGS

FIELD OF THE INVENTION

The present invention provides a stable, low density, ready-to-spread frosting and methods of preparing the frosting.

BACKGROUND OF THE INVENTION

Frostings are commonly applied as topping to sweeten and decorate baked goods such as, for example, cakes, breads, donuts, muffins, and cookies. Many consumers, including commercial bakers, prefer ready-to-spread frostings because of the convenience and time savings such frostings can provide. Additionally, many consumers prefer low density, aerated frostings because these products are considered easier to spread and have a softer, lighter texture than traditional frostings. Low density frostings also have fewer calories per volume compared to traditional frostings.

Early attempts to prepare low density, ready-to-spread frostings were not successful because the frostings were not stable. Low density is achieved through introduction of gas cells into the frosting by aeration or whipping to create a foam. If the foam is not stable, the volume of the frosting can decrease upon stirring or scooping. Additionally, after extended storage of the low density frosting, the gas cells created in the frosting can coalesce resulting in large voids or air pockets and a heterogeneous texture due to density differences. Other modes of failure include emulsion breakdown with separation of water from the fat.

Various attempts have been made to provide a low density frosting composition that is stable upon extended storage. Some compositions provide stability by the inclusion of palm oil hard stock as an essential ingredient in the shortening component of the frosting. The palm oil hard stock has a high melting point and helps prevent the collapse of the three dimensional matrix that holds the gas cells. Although the resulting frostings are stable for extended periods, the products tend to have a waxy mouth feel due to the presence of the palm oil hard stock.

SUMMARY OF THE INVENTION

The invention relates to compositions and methods of preparing ready-to-serve, whipped frostings that are stable and have a density of about 0.7 to about 1.0 g/cc. The frostings comprise an aqueous phase and a shortening phase. The aqueous phase comprises an aqueous phase gel, sucrose, and an aqueous phase emulsifier. The aqueous phase gel comprises water and maltodextrin, water and inulin, or water and a mixture of maltodextrin and inulin. The amount of water in the frosting is less than or equal to about 21 weight percent based on the weight of the frosting. The maltodextrin has a dextrose equivalent value of about 5 to less than 20. The inulin has a molecular weight comparable to maltodextrin having a dextrose equivalent value of about 5 to less than 20. Typically, the weight ratio of maltodextrin to water, the weight ratio of inulin to water, or the weight ratio of the maltodextrin and inulin mixture to water is about 1:0.7 to about 1:2.8 (maltodextrin, inulin, or mixture thereof: water). Sucrose is present in an amount that exceeds the amount that can dissolve in the aqueous phase of the frosting composition. Typically the sucrose to water weight ratio is at least about 2:1 (sucrose:water). The shortening phase comprises a shortening having a Solid Fat Index of about 12 percent or less at 104° F. (40° C.) and a shortening phase emulsifier.

One embodiment of the invention provides a frosting having a density of about 0.7 to about 1.0 g/cc and containing about 6 to about 18 weight percent maltodextrin having a dextrose equivalent value of about 5 to less than 20, about 13 to about 21 weight percent water, about 33 to about 60 weight percent sucrose, about 15 to about 27 weight percent shortening having a Solid Fat Index of about 12 percent or less at 104° F. (40° C.), and about 0.2 to about 3 weight percent emulsifiers. The emulsifiers comprise about 0.1 to about 1.5 weight percent of an aqueous phase emulsifier and about 0.1 to about 1.5 weight percent of a shortening phase emulsifier.

Another aspect of the invention provides a method for making a low density, whipped frosting. The method comprises (1) forming an aqueous phase gel comprising water and maltodextrin, water and inulin, or water and a mixture of maltodextrin and inulin; (2) forming a frosting composition comprising the aqueous phase gel, sucrose added in an amount that exceeds the amount that can dissolve in the aqueous phase, an aqueous phase emulsifier, a shortening phase emulsifier, and shortening having a Solids Fat Index of about 12 percent or less at 104° F. (40° C.); and (3) whipping the frosting composition to a density of about 0.7 cc/g to about 1.0 g/cc. The amount of water in the frosting is less than or equal to about 21 weight percent based on the weight of the frosting. The maltodextrin has a dextrose equivalent value of about 5 to less than 20. The inulin has a molecular weight comparable to that of a maltodextrin having a dextrose equivalent value of about 5 to less than 20. Typically the sucrose to water weight ratio is at least about 2:1 (sucrose: water). The weight ratio of maltodextrin to water, the weight ratio of inulin to water, or the weight ratio of the maltodextrin and inulin mixture to water is about 1:0.7 to about 1:2.8 (maltodextrin, inulin, or mixture thereof:water).

The stability of the frosting is provided by the formation of an aqueous phase gel rather than by manipulation of the shortening phase through the use of, for example, shortenings containing palm oil hard stock.

DETAILED DISCLOSURE OF THE INVENTION

The invention relates to a ready-to-serve, whipped frosting. In particular, the invention relates to compositions and methods for preparing ready-to-serve frostings that can be stored unopened for extended periods at room temperature with minimal volume loss as well as minimal separation of the aqueous and shortening phases. As used herein, the term "frosting" refers to a product that can be applied as a topping to sweeten and decorate baked goods such as, for example, cakes, breads, donuts, muffins, and cookies. The frostings can be applied as purchased to baked goods without mixing. As used herein, the term "ready-to-serve" denotes that no additional ingredients such as liquids need to be added to the product before use.

The frostings are stable and have low density. As used herein, the term "low density" refers to a frosting with a density of about 0.7 to about 1.0 g/cc. As used herein, "stable" refers to a frosting that has minimal phase separation after room temperature storage for six months. In some embodiments, there is no phase separation after room temperature storage for six months. Preferably, the frosting has a volume loss of less than about 20 percent after storage at room temperature for six months. The density of the frosting is preferably less than about 1.0 g/cc after storage at room temperature for six months. As used herein, "room temperature" refers to a temperature of about 21° C. to about 27° C.

The frosting comprises an aqueous phase and a shortening phase. The aqueous phase comprises an aqueous phase gel, sucrose, and an aqueous phase emulsifier. The aqueous phase gel comprises water and maltodextrin, water and inulin, or water and a mixture of maltodextrin and inulin. The maltodextrin has a dextrose equivalent value of about 5 to less than 20. The inulin has a molecular weight comparable to that of a maltodextrin having a dextrose equivalent value of about 5 to less than 20. Typically, the weight ratio of the maltodextrin to water, the weight ratio of the inulin to water, or the weight ratio of the inulin and maltodextrin mixture to water is about 1:0.7 to about 1:2.8 (maltodextrin, inulin, or mixture thereof:water). The frosting contains less than or equal to about 21 weight percent water based on the weight of the frosting. The sucrose is added in an amount that exceeds the amount that can dissolve in the aqueous phase. Typically, the sucrose to water weight ratio is at least about 2:1 (sucrose:water). The shortening phase comprises a shortening having a Solid Fat Index of about 12 percent or less at 104° F. (40° C.) and a shortening phase emulsifier.

The stability of the frosting is provided by formation of an aqueous phase gel rather than by manipulation of the shortening phase through the use of, for example, shortenings containing palm oil hard stock. The resulting frostings typically do not have a waxy texture or mouth feel. The aqueous phase gel comprises water and maltodextrin, water and inulin, or water and a mixture of maltodextrin and inulin.

Maltodextrin is a non-sweet, nutritive saccharide polymer consisting of D-glucose units linked primarily by alpha-1-4 bonds. Maltodextrin is prepared by partial hydrolysis of a starch or a waxy starch with suitable acids, enzymes, or a combination thereof. Maltodextrin is characterized by the dextrose equivalent value. As used herein, the phrases "dextrose equivalent value" or "DE value" refer to a measure of the reducing sugar content calculated as percent dextrose. A maltodextrin having a lower DE value has a higher molecular weight and a lower reducing sugar content than a maltodextrin having a higher DE value.

A maltodextrin having a DE value less than about 5 tends to impart an off-flavor to the frosting and to produce a frosting having a density above about 1.0 g/cc. On the other hand, a maltodextrin with a high DE value of 20 or greater typically forms a thin aqueous gel that cannot hold air effectively. The resulting frosting tends to have low stability towards volume loss and emulsion breakdown. A maltodextrin suitable for the invention has a DE value of about 5 to less than 20. The resulting frostings can have the combined properties of stability, no off-flavor, and low density. In some embodiments, the DE value of the maltodextrin is about 5 to about 18 or about 10 to about 15. The aqueous phase gel provides a matrix that can hold air upon aeration or whipping of the frosting.

Inulin can be used to replace part or all of the maltodextrin in the frostings of the invention. Inulin is a fructose polymer. A suitable inulin has a molecular weight comparable to that of a maltodextrin having a DE value of about 5 to less than 20.

Water and maltodextrin, water and inulin, or water and a mixture of maltodextrin and inulin are preferably mixed to form the aqueous phase gel either in the absence of any other ingredients or in the presence of an aqueous phase emulsifier. Some of the maltodextrin or inulin can be dispersed rather than dissolved in the water. As used herein, a "dispersed" ingredient refers to an ingredient that is distributed throughout the aqueous phase but not dissolved. The absence of the other ingredients such as sucrose ensures maximum hydration of the maltodextrin or inulin.

The weight ratio of the maltodextrin to water, the weight ratio of the inulin to water, or the weight ratio of the mixture of maltodextrin and inulin to water (maltodextrin, inulin, or mixture thereof:water) is about 1:0.7 to about 1:2.8; that is, the weight ratio is about 1.4 to about 0.3. The aqueous phase gel contains about 26 to about 58 weight percent maltodextrin, inulin, or a mixture of maltodextrin and inulin. The resulting frosting contains about 6 to about 18 weight percent maltodextrin, inulin, or a mixture of maltodextrin and inulin. In some embodiments, the frosting contains about 8 to about 15 weight percent maltodextrin, inulin, or a mixture of maltodextrin and inulin.

The frosting contains no more than about 21 weight percent water. Water content in this range aids in the prevention of microbial growth and prevention of phase separation in the frosting. A frosting having more than about 21 weight percent water tends to be less stable, becoming denser over time. The frosting typically contains about 13 to about 21 weight percent water based on the weight of the frosting. In some embodiments, the frosting contains about 14 to about 20 weight percent or about 16 to about 18 weight percent water based on the weight of the frosting. If the water content is too low, the frosting tends to have a density greater than about 1 g/cc, a dry appearance, and a low spreadability.

The aqueous phase of the frosting composition also contains sucrose. Not all the sucrose is dissolved in the aqueous phase of the frosting; that is, the amount of sucrose added is in excess of the amount that can dissolve in the aqueous phase. The excess sucrose is dispersed in the aqueous phase. The sucrose to water weight ratio is at least about 2:1 (sucrose:water). The presence of fine crystalline sucrose contributes to the creaminess of the frosting. Additionally, the sucrose contributes bulk and body to the frosting. Many of the organoleptic properties of the product such as, for example, sweetness, texture, viscosity, density, and taste are affected by the amount of sucrose. Sucrose is typically added to the frosting in an amount from about 33 to about 60 weight percent based on the weight of the frosting composition. In some embodiments, the frostings contains from about 40 to about 55 weight percent sucrose.

The sucrose can be from cane sugar, beet sugar, or a combination thereof. The sucrose is typically used in either a granular or powdered form. Finer granular or powdered sugar tends to result in frostings with smoother texture and less grittiness. Powdered sugar is commercially available in various grain sizes such as, for example, 6X, 10X, or 12X. In some embodiments, the powdered sugar is 12X, otherwise known as fondant sugar or icing sugar. The average particle size of the grains in 12X powdered sugar is typically less than about 45 $\mu$m.

The aqueous phase of the frosting composition also contains an aqueous phase emulsifier. Suitable emulsifiers for the aqueous phase are typically esters of polyhydric alcohols. Examples include polyoxy-20-ethylene sorbitan monooleate (known as polysorbate 80 and available as Glycosperse™ O–20K FG from Lonza Inc. located in Fair Lawn, N.J. and as Tween™ 80 from ICI Americas located in Wilmington, Del.), polyoxy-20-ethylene sorbitan stearate (known as polysorbate 60 and available as Glycosperse™ S-20K 60 from Lonza Inc.), and a decaglycerol monooleate (available as Polyaldo™ 10-1-0 from Lonza, Inc.). In some embodiments, a combination of aqueous phase emulsifiers is preferred. For example, emulsifiers such as polysorbate 80 can provide good stability but a decaglycerol monooleate provides better taste. The aqueous phase emulsifier is typically about 0.1 to about 1.5 weight percent based on the weight of the frosting. In some embodiments, the aqueous phase emulsifier is about 0.1 to about 1 or about 0.1 to about 0.5 weight percent of the frosting.

The shortening phase of the frosting composition comprises shortening and a shortening phase emulsifier. The shortening can be a mixture of hydrogenated and partially hydrogenated shortening from any animal fat or vegetable oil. The shortening is typically a vegetable shortening such as, for example, soybean oil, cottonseed oil, peanut oil, canola oil, corn oil, safflower oil, sunflower seed oil, or mixtures thereof. In one embodiment, the shortening is a mixture of soybean oil and cottonseed oil. Preferably, the shortening does not contain palm oil.

The shortening is characterized by Solid Fat Index (SFI), the proportion of material that remains solid in the shortening at a specific temperature. The SFI can be determined using American Oil Chemists Society (AOCS) Method Cd 10-57 (published in 1998). The shortening composition generally has a SFI of about 12 percent or less at 104° F. (40° C.). In some embodiments, the SFI is about 6 percent or less at 104° F. (40° C.). The shortening preferably does not impart a waxy mouth feel to the frosting.

The frosting typically contains about 15 to about 27 weight percent shortening based on the weight of the frosting. In some embodiments, the frosting contains about 18 to about 22 weight percent shortening.

The shortening phase contains an emulsifier that facilitates dispersion of the shortening in the frosting composition. This emulsifier is typically a mixture of monoglycerides of long chain fatty acids such as, for example, oleic acid, palmitic acid, linoleic acid, and the like. Low levels of diglycerides can be present. The amount of shortening phase emulsifier is typically about 0.1 to about 1.5 weight percent based on the weight of the frosting composition. In some embodiments, the frosting composition contains about 0.1 to about 1.0 or about 0.1 to about 0.5 weight percent monoglycerides.

The monoglycerides can be added directly to the frosting composition or can be present in the shortening as purchased from a vendor. For example, the shortening can contain from about 1 to about 5 weight percent monoglyceride. One such shortening is F842X Icing Shortening from Bunge Foods, St. Louis Mo.; this shortening contains about 2 weight percent alpha-monoglyceride emulsifiers.

The total emulsifier concentration in the frosting typically varies from about 0.2 to about 3 weight percent based on the weight of the frosting. If the concentration of the emulsifier is too high, then an off-flavor can arise. On the other hand, if the concentration is too low, then the frosting tends to be unstable. The emulsifiers are chosen based on their ability to form a stable whipped frosting with the least amount of objectionable off-flavor resulting in the frosting. In addition to improving the resistance of the frosting to collapse, emulsifiers can also help prevent the separation of the shortening and aqueous phases upon extended storage. Additionally, emulsifiers can improve the spreadability of the frosting.

In one embodiment, the invention provides a frosting composition containing about 6 to about 18 weight percent maltodextrin having a dextrose equivalent value of about 5 to less than 20, about 13 to about 21 weight percent water, about 33 to about 60 weight percent sucrose, about 15 to about 27 weight percent shortening having a Solid Fat Index less than about 12 percent at 104° F. (40° C.), about 0.1 to about 1.5 weight percent aqueous phase emulsifier, and about 0.1 to about 1.5 weight percent shortening phase emulsifier. The frosting typically has a density from about 0.7 to about 1.0 g/cc or from about 0.8 to about 0.9 g/cc.

The frosting compositions of the invention can further comprise one or more viscosifiers, agents added to increase the viscosity of the frosting, enhance spreadability, and improve mouth feel. Increasing the viscosity tends to reduce the flow of the frosting after application to baked goods. Additionally, viscosifiers can improve the stability of the frostings by minimizing the volume losses caused by coalescence of entrapped gas cells. Viscosifiers are typically present in the frosting up to about 0.8 weight percent based on the weight of the frosting. In one embodiment, the frosting contains about 0.05 to about 0.8 weight percent viscosifiers. Suitable materials include a variety of gums, pectin, water-soluble cellulose compounds, and the like. Examples include guar gum, locust bean gum, xanthan gum, gelatin, pectin, low methoxy pectin, sodium carboxymethylcellulose, microcrystalline cellulose, pre-gelled starch, and the like. Mixtures of various viscosifiers can be used such as AVICEL™, a mixture of microcrystalline cellulose and sodium carboxymethylcellulose available from FMC, Philadelphia, Pa. In one embodiment, the viscosifier is a combination of about 0.1 to about 0.3 weight percent microcrystalline cellulose, about 0.1 to about 0.3 weight percent pre-gelled starch, and about 0.06 to about 0.2 weight percent low methoxy pectin based on the weight of the frosting.

The frosting compositions of the invention can further comprise additional ingredients such as, for example, flavorings, colorants, preservatives, vitamins, minerals, sequestering agents, buffers, acidulants, and antioxidants. Suitable flavorings include cream cheese, chocolate, vanilla extract, fruit, fruit extracts, nuts, and the like. Suitable colorants include, for example, opacifiers such as titanium dioxide and food coloring such as Yellow #5 and Red #40. Suitable preservatives include, for example, potassium sorbate, sorbic acid, dehydroacetic acid, natamycin, and sodium benzoate.

Another aspect of the invention provides a method of making a whipped frosting. The method comprises (1) forming an aqueous phase gel comprising water and maltodextrin, water and inulin, or water and a mixture of maltodextrin and inulin; (2) forming a frosting composition comprising the aqueous phase gel, sucrose added in an amount that exceeds the amount that can dissolve in the aqueous phase, an aqueous phase emulsifier, a shortening phase emulsifier, and shortening having a SFI less than about 12 percent at 104° F. (40° C.); and (3) whipping the frosting composition to a density from about 0.7 g/cc to about 1.0 g/cc to form a whipped frosting. The maltodextrin has a dextrose equivalent value of about 5 to less than 20. The inulin has a molecular weight comparable to that of a maltodextrin having a dextrose equivalent value of about 5 to less than 20.

The amount of water in the frosting is less than or equal to about 21 weight percent based on the weight of the frosting. The aqueous phase gel typically contains about 26 to about 58 weight percent maltodextrin, inulin, or a mixture of maltodextrin and inulin based on the weight of the gel composition. The weight ratio of maltodextrin to water, the weight ratio of inulin to water, or the weight ratio of the maltodextrin and inulin mixture to water (maltodextrin, inulin, or mixture thereof:water) typically is about 1:0.7 to about 1:2.8. In some embodiments, all or a portion of an aqueous phase emulsifier is added to the aqueous phase gel.

The aqueous phase gel typically is stirred to maximize the hydration of the maltodextrin, inulin, or a mixture of maltodextrin and inulin. Any method of stirring can be used. Usually, some of the maltodextrin, inulin, or mixture of maltodextrin and inulin is not dissolved but dispersed in the water. The aqueous phase gel can be formed at any temperature from about room temperature to about 190° F. (88° C.). In some embodiments, the water is heated to the desired temperature prior to the addition the maltodextrin, inulin, or mixture of maltodextrin and inulin. In some embodiments, the water is heated to the desired temperature prior to addition of the aqueous phase emulsifier.

After formation of the aqueous phase gel, a frosting composition is prepared. The frosting composition comprises the aqueous phase gel, sucrose, an aqueous phase emulsifier, a shortening phase emulsifier, and shortening. The amount of sucrose added typically exceeds the amount that can dissolve in the aqueous phase of frosting composition. The sucrose to water weight ratio is at least about 2:1 (sucrose:water). The shortening has a SFI less than about 12 percent at 104° F. (40° C.). In one embodiment, the frosting composition contains about 6 to about 18 weight percent maltodextrin, about 13 to about 21 weight percent water, about 33 to about 60 weight percent sucrose, about 15 to about 27 weight percent shortening, about 0.1 to about 1.5 weight percent aqueous phase emulsifier, and about 0.1 to about 1.5 weight percent shortening phase emulsifier.

The temperature for formation of the frosting composition can vary from room temperature to about 190° F. (88° C.). The temperature is usually above the melting point of the shortening. Generally, the frosting composition is stirred to provide a homogenous mixture. Any stirring method that provides sufficient shear to form an emulsion can be used.

The order of addition of the sucrose, emulsifiers, and shortening is not critical. In some embodiments, the shortening is added last. The shortening phase emulsifier is typically added with the shortening or before addition of the shortening to the frosting composition.

In some embodiments, the frosting composition further comprises one or more of the following ingredients: flavorings, colorants, preservatives, vitamins, minerals, sequestering agents, buffers, acidulants, and antioxidants. The order of addition of these components is not critical. In one embodiment, these ingredients are added before the addition of the shortening. In other embodiments, the flavoring is added last.

After all the ingredients have been added, the frosting composition is whipped to a density of about 0.7 g/cc to about 1.0 g/cc. In one embodiment, a nitrogen purge or blanket is provided for the frosting composition. The presence of nitrogen can minimize oxidation reactions that could impart an objectionable flavor to the resulting whipped frosting.

After whipping the frosting composition, the frosting is generally extruded or transferred into containers. The containers are then sealed.

The following examples are provided for exemplary purposes. The invention is not limited to the examples.

EXAMPLES

Example 1 and Comparative Examples 1—1 to 1–3

Effect of DE Value on Frosting Density and Volume Loss

Four frosting compositions (Example 1 and Comparative Examples 1—1 to 1–3) were prepared using carbohydrates of varying dextrose equivalent (DE) values. Examples 1 was prepared according to the invention. Comparative Examples 1—1 and 1–2 did not contain maltodextrin. Comparative Example 1–3 contained a maltodextrin having a DE value not in accord with the invention. Common ingredients in the four frostings are shown in Table 1.

TABLE 1

Common Ingredients in Samples

| Ingredient | Weight % | Source |
|---|---|---|
| Salt | 0.50 | Star Flake dendritic salt, Morton Salt, Rittman OH |
| Microcrystalline cellulose | 0.30 | Avicel RC-591, FMC Corp., Philadelphia PA |
| Titanium dioxide | 0.27 | Warner-Jenkinson Co., a subsidiary of Sensient Technologies Corp., St. Louis, MO |
| Potassium sorbate | 0.10 | Nutrinova, Inc., Somerset, NJ |
| Citric acid | 0.02 | A.E. Staley, Dayton OH |
| Yellow #5 | 0.02 | Yellow 15-WS-SD-619617, Chr Hansen, Vineland NJ |
| Red #40 | 0.01 | Red 065-WS-SD-619615, Chr Hansen, Vineland NJ |
| Powdered sugar | 57.00 | 12X, Holly Sugar, Sugarland TX |
| Shortening | 20.00 | F842X Icing Shortening[1], Bunge Foods, St. Louis MO |
| Water | 14.15 | |
| Vanilla flavor | 0.30 | Art. vanilla fl. FD9969, Givaudan Roure, Cincinnati OH |
| Polysorbate 80 | 0.18 | Glycosperse 0–20K FG, Lonza Inc., Fair Lawn NJ |

[1]The shortening contained 2 wt. % alpha monoglyceride emulsifier.

The remaining 7.15% of the formula consisted of different carbohydrates as shown in Table 2.

TABLE 2

Carbohydrates used in Example 1 and Comparative Examples 1-1 to 1-3

| Sample | Carbohydrate | Source |
|---|---|---|
| Example 1-1 | 10 DE maltodextrin | Maltrin M100, Grain Processing Corp., Muscatine IA |
| Comparative Ex. 1-1 | 42 DE corn syrup solids | C*Dry GL 01946, Cerestar, Hammond IN |
| Comparative Ex. 1-2 | 25 DE corn syrup solids | Maltrin M250, Grain Processing Corp., Muscatine IA |
| Comparative Ex. 1-3 | 1 DE maltodextrin | Star-Dri 1, A.E Staley, Dayton OH |

The frostings were made using a bench top process. The vanilla flavor, salt, food colorants, microcrystalline cellulose, preservatives and powdered sugar were blended for five minutes using a Hobart paddle mixer at speed one. The shortening was added next and blended for five minutes at speed one.

In a smaller Hobart paddle mixer, the carbohydrate and polysorbate 80 were added to the water and blended. This solution or dispersion was then added slowly to the mixing bowl containing the sugar/shortening blend while the paddle mixer was operated at speed one. The water addition took one minute and the combined ingredients were scraped down and blended at speed one for one additional minute. After another scrapedown, the entire mixture was whipped for five minutes at speed three.

Each frosting was packed into a high density polyethylene (HDPE) straight side wall cylindrical container. The container was overfilled, then the excess frosting was scraped off the top with a straight-edged metal spatula held perpendicularly to the top surface by scraping half the top surface in one direction, rotating the container ¼ turn and scraping the off the remainder.

The initial density was determined by dividing the weight of the frosting in grams by the volume of the container in cubic centimeters. The volume was determined by the equation $\pi r^2 h$ where r is the radius of the container (4.05 cm) and h is the height of the container (9.20 cm).

Initial frosting densities for the four frostings are shown in Table 3.

TABLE 3

Initial densities

| Sample | Carbohydrate | Density (g/cc) |
|---|---|---|
| Example 1-3 | 10 DE maltodextrin | 0.85 |
| Comparative Ex. 1-1 | 42 DE corn syrup solids | 0.80 |
| Comparative Ex. 1-2 | 25 DE corn syrup solids | 0.85 |
| Comparative Ex. 1-3 | 1 DE maltodextrin | 0.94 |

The containers were then covered with polyethylene lids. Samples were placed in 100° F./20% relative humidity storage for a period of 137 hours, then removed and allowed to equilibrate to ambient temperature approximately 4 hours. The frosting was then stirred 20 times with a metal spatula and the top surface was smoothed. The average headspace distance was measure 4 times. The percent volume lost was calculated as height lost (cm)/initial height (cm) ×100 and is shown in Table 4. The density after storage is related to the percent volume loss. The density was calculated using the original weight and the reduced height.

TABLE 4

% volume loss for Examples 1 after 100° F. stress for 1 week (137 hours)

| Sample | Carbohydrate | % Volume loss | Density, g/cc |
|---|---|---|---|
| Example 1-1 | 10 DE maltodextrin | 19% | 1.04 |
| Comparative Ex. 1-1 | 42 DE corn syrup | 31% | 1.15 |
| Comparative Ex. 1-2 | 25 DE corn syrup | 24% | 1.12 |
| Comparative Ex. 1-3 | 1 DE maltodextrin | 16% | 1.12 |

Samples prepared with maltodextrin lost less volume upon storage at 100° F. (38° C.) compared to samples prepared using carbohydrates with DE values greater than 20. The 10 DE maltodextrin frosting had the lowest density.

Example 2 and Comparative Example 2

Evaluation of stability of frosting

Example 2 was prepared according to the invention. Comparative Example 2 is a frosting composition lacking maltodextrin. Comparative Example 2 contained the ingredients shown in Table 5.

TABLE 5

Composition of Comparative Example 2

| Ingredient | Weight % | Source |
|---|---|---|
| Salt | 0.37 | Star Flake dendritic salt, Morton Salt, Rittman OH |
| Dextrose | 7.40 | ADM Corn Processing, Clinton IA |
| Yellow #5 | 0.02 | Yellow 15-WS-SD-619617, Chr Hansen, Vineland NJ |
| Red #40 premix | 0.01 | Red 065-WS-SD-619615, Chr Hansen, Vineland NJ |
| Vanilla flavor | 0.37 | Art. vanilla fl. FD9969, Givaudan Roure, Cincinnati OH |
| Powdered sugar | 46.05 | 12X, Holly Sugar, Sugarland TX |
| Shortening | 10.30 | F842X Icing Shortening[1], Bunge Foods, St. Louis MO |
| Butter | 10.60 | Land O'Lakes, Arden Hills MN |
| Cocoa (alkalized) | 4.44 | D-11-S, ADM Cocoa, Koog Aan De Zaan, the Netherlands |
| 24 DE Corn syrup solids | 3.70 | C*Dry GL 01925, Cerestar, Hammond IN |
| Non-fat dry milk | 0.74 | Spray dried low heat, Dairy America/California Dairies, Fresno CA |
| PG starch | 0.56 | Pregelatinized waxy maize, Instant Clearjel, National Starch, Indianapolis IN |
| Water | 15.40 | |
| Polysorbate 60 | 0.05 | Lonza Inc., Fair Lawn, New Jersey |

[1]The shortening contained 2 wt. % alpha monoglyceride emulsifier.

The processing for Comparative Example 2 included a creaming step in which powdered sugar and other dry ingredients were mixed at high speed with the shortening and butter. The processing also included a step in which the water was used to hydrate the corn syrup solids, non-fat dry milk, and starch before the liquid combination was added to the creamed sugar and fat.

The salt, dextrose, food colorants, and approximately half of the powdered sugar were blended for five minutes using a Hobart paddle mixer at speed one. The shortening and butter were added next and blended for two minutes at speed one followed by a scrape down. The mixture was then creamed by blending for five minutes at speed three using one intermediary scrape down. The remaining sugar and cocoa were added.

The water was placed in a blender. The 24 DE corn syrup solids, non-fat dry milk, and starch were dry blended and slowly added to the vortex in the water formed when the blender was operated at 50% power. Polysorbate 60 was added to the blender.

With the Hobart paddle mixer at speed one, the blender mixture was added over the span of about one minute followed by another scrape down. The entire mixture was whipped for five minutes at a speed of three using one intermediary scrape down.

After mixing, the initial density of the Comparative Example 2 frosting was determined and it was packaged as described for Example 1.

Example 2 is a frosting composition prepared in accord with the invention. The frosting contained 13 weight percent maltodextrin having a DE value of 10. The formula used for Example 2 is shown in Table 6.

TABLE 6

Composition of Example 2

| Ingredient | Weight % | Source |
|---|---|---|
| Salt | 0.55 | Star Flake dendritic salt, Morton Salt, Rittman OH |
| Vanilla flavorants | 0.03 | Crompton and Knowles Ingredient Technology Corp., Mohwah, NJ |

TABLE 6-continued

Composition of Example 2

| Ingredient | Weight % | Source |
| --- | --- | --- |
| microcrystalline cellulose | 0.30 | Avicel RC-591, FMC Corp., Philadelphia PA |
| citric acid | 0.22 | A.E. Staley, Dayton OH |
| potassium sorbate | 0.13 | Harris and Ford, Indianapolis IN |
| 10DE malto-dextrin | 13.00 | Maltrin M100, Grain Processing Corp., Muscatine IA |
| Powdered sugar | 40.33 | 12X, Holly Sugar, Sugarland TX |
| Shortening | 20.53 | F842X Icing Shortening[1], Bunge Foods, St. Louis MO |
| Cocoa (alkalized) | 6.00 | D-11-S, ADM Cocoa, Koog Aan De Zaan, the Netherlands |
| Water | 18.61 | |
| Polyglycerol ester 10-1-0 | 0.30 | POLYALDO 10-1-0, Lonza Inc., Fair Lawn, New Jersey |

[1] The shortening contained 2 wt. % alpha monoglyceride emulsifier.

The processing of Example 2 was done on a pilot plant scale. Water was heated to approximately 140° F. (60° C.) in a jacketed vessel and the maltodextrin was added with high shear. Heating was discontinued and then heated emulsifier (Polyaldo 10-1-O, approximately 140° F.) was added. Then the flavorants, cellulose gum and preservatives were added to the mixture. The cocoa was then added. The powdered sugar was the final dry ingredient addition. At this point the temperature of the aqueous mixture was 110° F. (43° C.) to 120° F. (49° C.).

The shortening was melted in a jacketed vessel and incorporated into the aqueous mixture with high shear to form a uniform emulsion. The frosting emulsion was passed through a de-aerator, a homogenizer, and a scraped-surface heat exchanger. This process cooled the frosting and whipped in nitrogen gas to achieve the desired density.

The frosting was extruded into HDPE straight-walled cylindrical containers and filled to leave some headspace. The containers were tapped to eliminate some the air voids from the frosting. The initial density was calculated as described for Example 1. Because the containers of Example 2 weren't completely filled, the initial height was determined by averaging four height measurements.

The containers were then heat-sealed with foil and covered with a polyethylene lid. The samples were subjected to elevated temperature storage (100° F./20% relative humidity). The percent volume loss and density was determined using the method described for Example 1. Initial densities and volume loss for Example 2 and Comparative Example 2 are given in Table 7.

TABLE 7

Initial Density and Volume Loss, Example 2 and Comparative Example 2

| | Example 2 | Comparative Example 2 |
| --- | --- | --- |
| Initial material | 0.83 g/cc | 0.83 g/cc |
| 1 week 100° F. | 17% volume loss 0.97 g/cc | |
| 2 week 100° F. | | 26% volume loss 1.15 g/cc Separation |
| 4 week 100° F. | 21% volume loss 1.02 g/cc No separation | 32% 1.25 g/cc Extensive separation |

In addition to the higher volume loss, Comparative Example 2 also lacked emulsion stability. After 2 weeks at 100° F. (38° C.), the frosting had separated into 2 phases with a 3.5 cm layer of oil (approximately ⅓ of the total frosting height of 9 cm). After storage for 4 weeks at 100° F. (38° C.), the can lid was concave and the outside of the can was greasy. Example 2 did not separate after storage for 4 weeks at 100° F. (38° C.).

Example 3 and Comparative Examples 3-1 and 3-2

Centrifuged Samples

Example 3 was a vanilla frosting made in accord with the invention in a pilot plant using the same procedure used to prepare Example 2. Comparative Example 3-1 was a high-density vanilla frosting commercially available, prepared without any maltodextrin. Comparative Example 3-2 was a commercially available low-density frosting that contains palm oil hardstock. The ingredients for Example 3 are in Table 8.

TABLE 8

Ingredients for Example 3

| Ingredient | % Weight |
| --- | --- |
| Powdered sugar | 48.62 |
| Shortening | 20.56 |
| Water | 17.00 |
| 10DE Maltodextrin | 12.00 |
| Salt | 0.50 |
| Vanilla | 0.30 |
| Titanium dioxide | 0.27 |
| Polyglycerol 10-1-0 | 0.30 |
| Microcrystalline cellulose | 0.30 |
| Potassium sorbate | 0.10 |
| Citric acid | 0.02 |
| FD&C R#40 | 0.01 |
| Yellow #5 | 0.02 |

The three samples were centrifuged at 17,210 grams of relative centrifugal force for 30 minutes and 40 minutes in a Sorvall RC-5B Centrifuge, Kendro Laboratory Products, Newtown, Conn. The centrifuged frostings separated into distinct fat, aqueous, and solids layers. The two top centrifuged layers consisted of fat. The top layer was liquid oil and next layer was solid fat. Immediately below the fat layers was the aqueous layer. The bottom solids layer was made up of mostly crystalline sugar.

The centrifuged aqueous layer of all samples was analyzed for moisture, fat, sucrose, maltose, and consistency. Results are reported in Table 9. A description of each analysis performed follows. Moisture was determined with a 16 hour, 70° C. vacuum oven method. The weight loss was used to determine the moisture content. The method is a modified version of Official Method #977.21 of the Association of Official Analytical Chemists (AOAC). Fat was determined using a petroleum ether extraction procedure with a Soxhlet extractor. The method is similar to AOAC Official Method #920.177. The sucrose and maltose concentrations were determined using a high performance liquid chromatography method. The method was a modified version of AOAC Official Method #977.20. The consistency of the aqueous layer was measured using a small sample adapter on a Brookfield Model RV made by Brookfield Engineering Laboratories, Inc., Middleboro, Mass. The results are reported as K and n from the Power Law relationship: $\sigma = K\gamma^n$, where $\sigma$ is shear stress, K is the consistency coefficient, $\gamma$ is the shear rate, and n is the flow behavior index which indicates the closeness to Newtonian flow.

TABLE 9

Aqueous Phase Centrifuged Sample Analysis

| Example | Fat by PET Ether Extraction (%) | Sucrose % | Maltose % | Moisture % | Power Law Consistency Coefficient K (cp) | Power Law Flow Behavior Index n |
|---|---|---|---|---|---|---|
| 30 minutes at 17210 grams of relative centrifugal force ||||||||
| Example 3 | 14.2 | 39.4 | 1.6 | 23.7 | 38386 | 0.673 |
| Comparative Ex. 3-1 | 0.4 | 54.7 | 2.7 | 29.3 | 613 | 0.986 |
| Comparative Ex. 3-2 | 0.5 | 54.8 | 7.2 | 29.5 | 2356 | 0.869 |
| 40 minutes at 17210 grams of relative centrifugal force ||||||||
| Example 3 | 1.2 | 47.5 | <1.0 | 27.1 | 4869 | 0.981 |
| Comparative Ex. 3-1 | 0.7 | 53.8 | <1.0 | 29.1 | 589 | 0.988 |
| Comparative Ex. 3-2 | 0.6 | 55.4 | 7.6 | 30.0 | 2229 | 0.867 |

The aqueous phase from the 30 minute centrifuged sample of Example 3 with the gelled maltodextrin was opaque, creamy, and thick with a power law coefficient K of 38,386 centipoise. This "aqueous" layer contained 14.16% fat; the aqueous layer had not completely separated from the fat layer, demonstrating the stability of the aqueous phase of the system provided by the maltodextrin gel. The 40 minute centrifuged sample of Example 3 had only 1.2% fat and the consistency coefficient (K) of the layer had decreased with reduction in fat, but it is still had over twice the consistency coefficient of Comparative Example 3-2.

The aqueous phases of Comparative Example 3-1 and 3-2 were watery and much thinner in consistency than Example 3 in both the 30 minute and 40 minute centrifuged samples. These samples did not have the benefit of the maltodextrin gel. The aqueous phase of Comparative Example 3-1 and Comparative Example 3-2 had completely separated from the shortening phases after 30 minutes of centrifuging. Comparative Example 3-1 had only 0.4% fat and Comparative Example 3-2 had only 0.47% fat in their respective aqueous phases after 30 minutes of centrifuging.

Example 4

Comparison of Various Maltodextrin to Water Weight Ratios—10 DE and 5 DE

A series of frosting were formulated by varying the weight ratio of the maltodextrin to water and the total amount of water. Examples 4-1, 4-2 and 4-3 were made in accord with the invention; Comparative Example 4-1 had a water content and a sucrose to water weight ratio that were not in accord with the invention. The ingredients used are as described in Example 1; one additional ingredient, the 5 DE maltodextrin, is Maltrin M040 from Grain Processing Corporation, Muscatine Iowa. The formulas used for Examples 4-1 to 4-3 and Comparative Example 4 are given in Table 10.

TABLE 10

Compositions of Example 4

| Ingredient | Comparative Example 4 | Example 4-1 | Example 4-2 | Example 4-3 |
|---|---|---|---|---|
| Salt | 0.50 | 0.50 | 0.50 | 0.50 |
| Cellulose gum | 0.30 | 0.30 | 0.30 | 0.30 |
| Titanium dioxide | 0.27 | 0.27 | 0.27 | 0.27 |
| Potassium sorbate | 0.10 | 0.10 | 0.10 | 0.10 |
| Citric acid | 0.02 | 0.02 | 0.02 | 0.02 |
| Yellow #5 | 0.02 | 0.02 | 0.02 | 0.02 |
| Red #40 | 0.01 | 0.01 | 0.01 | 0.01 |
| Powdered sugar | 39.44 | 49.02 | 49.02 | 49.02 |
| Shortening | 20.56 | 20.56 | 20.56 | 20.56 |
| Water | 24.00 | 18.00 | 18.00 | 13.73 |
| 10 DE maltodextrin | 14.30 | 10.73 | | 15.00 |
| 5 DE maltodextrin | | | 10.73 | |
| Vanilla flavor | 0.30 | 0.30 | 0.30 | 0.30 |
| Polysorbate 80 | 0.18 | 0.18 | 0.18 | 0.18 |

The processing for Examples 4-1 to 4-3 and Comparative Example 4 were similar to that in Example 1 with some modifications. The maltodextrin was sheared into water. The solution was heated in a double boiler, held for 10 minutes at 190° F., and then cooled. The flavorants, colorants and preservatives were blended with approximately one-half of the powdered sugar in a Hobart paddle mixer for 5 minutes at speed 1. The plastic shortening was added to the mixer and blended 2 minutes at speed 1, and then scraped down. The shortening/sugar blend was creamed at speed 3 for 5 minutes with one intermediary scrapedown.

Using a blender, the polysorbate 80 was sheared into the cooled maltodextrin solution.

The remaining powdered sugar was added to the Hobart mixing bowl. With the paddle mixer operating at speed 1, the maltodextrin solution was slowly poured into the frosting; after a scrapedown the composition was blended an additional 2 minutes at speed 1. The composition was then whipped for 5 minutes at speed 3 with two scrapedowns, an initial and an intermediary.

The frosting was packed as described in Example 1 and the initial density of the frosting was determined as described in Example 1.

Emulsion stability was evaluated after storage for 5 days at 100° F. (38° C.). The samples were cooled for at least four hours prior to the determination of whether any separation of the aqueous and shortening phases had occurred. The determination was based on a visual inspection of the samples. The amount of oil on the top of the frosting composition was used to determine if the separation was moderate or extensive. The results are in Table 11.

TABLE 11

Comparison of various maltodextrin to water weight ratios and sucrose to water weight ratios

| Example | % Water | Sucrose/Water Weight Ratio | Maltodextrin/Water Weight Ratio | Maltodextrin DE | Density, g/cc | Emulsion Stability |
|---|---|---|---|---|---|---|
| Comp. Ex. 4 | 24 | 1.6 | 0.596 | 10 DE | 0.70 | extensive separation |
| Ex. 4-1 | 18 | 2.7 | 0.596 | 10 DE | 0.74 | moderate separation |

TABLE 11-continued

Comparison of various maltodextrin to water weight ratios
and sucrose to water weight ratios

| Example | % Water | Sucrose/ Water Weight Ratio | Malto- dextrin/ Water Weight Ratio | Malto- dextrin DE | Density, g/cc | Emulsion Stability |
|---|---|---|---|---|---|---|
| Ex. 4-2 | 18 | 2.7 | 0.596 | 5 DE | 0.79 | no separation |
| Ex. 4-3 | 13.7 | 3.6 | 1.093 | 10 DE | 0.86 | no separation |

Example 4-1 and 4-2 differ only in the DE value of the maltodextrin. Less separation occurred with the maltodextrin having a higher molecular weight. A lower DE maltodextrin produced a more stable product but the density was higher. Example 4-1 and 4-3 differ in the weight ratio of maltodextrin to water, weight ratio of sucrose to water, and the water content. A higher maltodextrin to water weight ratio produced a more stable frosting but resulted in a frosting with a higher density. Comparative Example 4-1 separated extensively.

Example 5

Long Term Stability

Frosting was prepared using the formula described for Example 3 and using the pilot plant procedure described for Example 2. The initial density was 0.85 g/cc. The frostings were stored at room temperature (about 23° C.). After 145 days, the density was 0.94 g/cc; no separation of the aqueous and shortening phase had occurred. After 211 days, the stirred density was 0.96 g/cc and no separation between the aqueous and shortening phases had occurred. The initial and densities after storage were calculated using an average of 2 to 4 samples.

We claim:

1. A frosting comprising:
   (a) an aqueous phase comprising
      (i) an aqueous phase gel comprising water and maltodextrin, water and inulin, or water and a mixture of maltodextrin and inulin, wherein the amount of water is less than or equal to about 21 weight percent based on the weight of the frosting, the maltodextrin has a dextrose equivalent (DE) value of about 5 to less than 20, and inulin has a molecular weight comparable to that of maltodextrin having a DE value of about 5 to less than 20;
      (ii) an aqueous phase emulsifier;
      (iii) sucrose in an amount that exceeds the amount that can dissolve in the aqueous phase;
   (b) a shortening phase comprising
      (i) shortening having a Solids Fat Index (SFI) less than about 12 percent at 104° F. (40° C.); and
      (ii) a shortening phase emulsifier,
wherein the frosting has a density of about 0.7 to about 1.0 g/cc.

2. The frosting of claim 1, wherein the weight ratio of maltodextrin to water, the weight ratio of inulin to water, or the weight ratio of the mixture of maltodextrin and inulin to water is about 1:0.7 to about 1:2.8 (maltodextrin, inulin, or a mixture thereof:water).

3. The frosting of claim 1, wherein the maltodextrin, inulin, or mixture of maltodextrin and inulin is about 6 to about 18 weight percent and the water is about 13 to about 21 weight percent water based on the weight of the frosting.

4. The frosting of claim 1, wherein the sucrose to water weight ratio is at least about 2:1 (sucrose:water).

5. The frosting of claim 4, wherein the frosting contains about 33 to about 60 weight percent sucrose based on the weight of the frosting.

6. The frosting of claim 1, wherein the frosting contains about 15 to about 27 weight percent shortening based on the weight of the frosting.

7. The frosting of claim 1, wherein the shortening is soybean oil, cottonseed oil, peanut oil, canola oil, corn oil, safflower oil, sunflower seed oil, or mixtures thereof.

8. The frosting of claim 7, wherein the shortening is a mixture of soybean oil and cottonseed oil.

9. The frosting of claim 1, wherein the frosting contains 0.1 to 1.5 weight percent aqueous phase emulsifier and 0.1 to 1.5 weight percent shortening phase emulsifier.

10. The frosting of claim 1, wherein the aqueous phase emulsifier is an ester of a polyhydric alcohol.

11. The frosting of claim 10, wherein the aqueous phase emulsifier is polyoxy-20-ethylene sorbitan monooleate, polyoxy-20-ethylene sorbitan stearate, decaglycerol monooleate, or a mixture thereof.

12. The frosting of claim 1, wherein the shortening phase emulsifier is a monoglyceride of a long chain fatty acid.

13. A frosting comprising:
   (a) maltodextrin in an amount of about 6 to about 18 weight percent based on the weight of the frosting, wherein the maltodextrin has a dextrose equivalent (DE) value in the range of 5 to less than 20;
   (b) water in an amount of about 13 to about 21 weight percent based on the weight of the frosting;
   (c) sucrose in an amount of about 33 to about 60 weight percent based on the weight of the frosting;
   (d) shortening in an amount of about 15 to about 27 weight percent based on the weight of the frosting;
   (e) aqueous phase emulsifier in an amount of about 0.1 to about 1.5 weight percent based on the weight of the frosting; and
   (f) shortening phase emulsifier in an amount of about 0.1 to about 1.5 weight percent based on the weight of the frosting,
wherein the frosting has a density of about 0.7 to about 1.0 g/cc.

14. The frosting of claim 13, wherein the maltodextrin has a DE value in the range of about 5 to about 18.

15. The frosting of claim 13, wherein the maltodextrin is about 8 to about 15 weight percent and the water is about 14 to about 18 weight percent based on the weight of the frosting.

16. The frosting of claim 13, wherein the density is about 0.8 to about 0.9 g/cc.

17. The frosting of claim 13, wherein the sucrose is about 40 to about 55 weight percent based on the weight of the frosting.

18. The frosting of claim 13, wherein the shortening is about 10 to about 22 weight percent based on the weight of the frosting.

19. The frosting of claim 13, wherein the shortening has a Solids Fat Index (SFI) less than about 12 percent at 104° F. (40° C.).

20. The frosting of claim 19, wherein the shortening is soybean oil, cottonseed oil, peanut oil, canola oil, corn oil, safflower oil, sunflower seed oil, or mixtures thereof.

21. The frosting of claim 20, wherein the shortening is a mixture of soybean oil and cottonseed oil.

22. The frosting of claim 13, wherein the aqueous phase emulsifier is an ester of a polyhydric alcohol.

23. The frosting of claim 22, wherein the aqueous phase emulsifier is polyoxy-20-ethylene sorbitan monooleate, polyoxy-20-ethylene sorbitan stearate, decaglycerol monooleate, or a mixture thereof.

24. The frosting of claim 13, wherein the shortening phase emulsifier is a monoglyceride of a long chain fatty acid.

25. The frosting of claim 13, further comprising a viscosifier in an amount ranging from about 0.05 to about 0.8 weight percent.

26. The frosting of claim 13, wherein oil phase does not separate from an aqueous phase upon storage at room temperature for six months.

27. A method of making a frosting comprising:
  (a) preparing an aqueous phase gel comprising water and maltodextrin, water and inulin, or water and a mixture of maltodextrin and inulin, wherein the amount of water is less than or equal to about 21 weight percent based on the weight of the frosting, the maltodextrin has a dextrose equivalent value of about 5 to less than 20, and the inulin has a molecular weight comparable to that of maltodextrin having a dextrose equivalent value of about 5 to less than 20;
  (b) forming a frosting composition by mixing the aqueous phase gel with an aqueous phase emulsifier, a shortening phase emulsifier, shortening having a Solids Fat Index less than about 12 percent at 104° F. (40° C.), and sucrose in an amount exceeding the amount that can dissolve in an aqueous phase of the frosting composition; and
  (c) whipping the frosting composition to a density of about 0.7 g/cc to about 1.0 g/cc to form a whipped frosting.

28. The method of claim 27, wherein the weight ratio of maltodextrin to water, the weight ratio of inulin to water, or the weight ratio of the mixture of maltodextrin and inulin to water is about 1:0.7 to about 1:2.8 (maltodextrin, inulin, or a mixture thereof:water).

29. The method of claim 27, wherein the shortening is soybean oil, cottonseed oil, peanut oil, canola oil, corn oil, safflower oil, sunflower seed oil, or mixtures thereof.

30. The method of claim 27, wherein the sucrose to water weight ratio is at least about 2:1 (sucrose:water).

31. A method of making a frosting comprising:
  (a) preparing an aqueous phase gel comprising water and about 26 to about 58 weight percent maltodextrin based on the weight of the gel composition;
  (b) forming a frosting composition comprising the gel composition, sucrose, an emulsifier, and shortening, wherein the frosting composition comprises
    (i) maltodextrin in an amount of about 6 to about 18 weight percent based on the weight of the frosting composition having dextrose equivalent (DE) in the range of about 5 to less than 20;
    (ii) water in an amount of about 13 to about 21 weight percent based on the weight of the frosting composition;
    (iii) sucrose in an amount of about 33 to about 60 weight percent based on the weight of the frosting composition;
    (iv) shortening in an amount of about 15 to about 27 weight percent based on the weight of the frosting composition;
    (v) aqueous phase emulsifier in an amount of about 0.1 to about 1.5 weight percent based on the weight of the frosting composition;
    (vi) shortening phase emulsifier in an amount of about 0.1 to about 1.5 weight percent based on the weight of the frosting composition; and
  (c) whipping the frosting composition to a density from about 0.7 g/cc to about 1.0 g/cc to form a whipped frosting.

32. The method of claim 31, wherein the shortening is soybean oil, cottonseed oil, peanut oil, canola oil, corn oil, safflower oil, sunflower seed oil, or mixtures thereof.

* * * * *